United States Patent

Davidson et al.

[15] 3,649,097

[45] Mar. 14, 1972

[54] MICROSCOPE

[72] Inventors: Gilbert Davidson, Newton; John B. Orfei, North Revere; John Walters, Lexington, all of Mass.

[73] Assignee: American Science & Engineering Inc., Cambridge, Mass.

[22] Filed: Mar. 23, 1970

[21] Appl. No.: 21,701

[52] U.S. Cl. ............................ 350/84, 350/69, 350/87, 350/255
[51] Int. Cl. ............................................. G02b 21/00
[58] Field of Search .................. 350/84, 86, 87, 69, 77, 142, 350/235–241, 255

[56] References Cited

UNITED STATES PATENTS

| | | | |
|---|---|---|---|
| 3,391,975 | 7/1968 | Annis et al. | 350/238 |
| 2,013,422 | 9/1935 | Powell | 350/238 |
| 2,157,157 | 5/1939 | Anketell | 350/84 |
| 3,112,570 | 12/1963 | Vasconellos | 350/84 X |
| 2,194,227 | 3/1940 | Horan | 350/239 |
| 2,429,164 | 10/1947 | Mast et al. | 350/255 |
| 2,493,463 | 1/1950 | Morgan et al. | 350/255 |
| 2,971,080 | 2/1961 | Boughton | 350/87 |

FOREIGN PATENTS OR APPLICATIONS

| | | | |
|---|---|---|---|
| 955,478 | 6/1949 | France | 350/87 |

Primary Examiner—David H. Rubin
Attorney—Charles Hieken

[57] ABSTRACT

A microscope includes a block formed with a large opening accommodating a mirror pivotally mounted about an axis orthogonal to the axis of a small opening formed in the block that intersects with the large opening so that the mirror may reflect light into the small opening. A compound lens is supported above and coaxial with the small opening and is carried by the normally horizontal leg of a generally L-shaped member having its normally leg formed with a channel that rides vertically along one side of the block to permit axial displacement of the compound lens. This normally vertical leg is formed with an opening for receiving a cam cap attached to a wheel that is rotatably secured to the block to help hold the L-shaped member in position and controllably position it vertically as the wheel is rotated to permit focusing of the compound lens along a slide plane adjacent to the top of the opening. A slide support helps keep a slide in position in the slide plane between the small opening and the lens means.

5 Claims, 2 Drawing Figures

Patented March 14, 1972 3,649,097

INVENTOR
JOHN B. ORFEI
BY
Wolf, Greenfield, Hieken + Sacks
ATTORNEYS

3,649,097

MICROSCOPE

BACKGROUND OF THE INVENTION

The present invention relates in general to microscopes and more particularly concerns a novel microscope that is rugged enough to be handled by elementary students, relatively inexpensive to fabricate so that each elementary student may have one for his own use and yet affords a high degree of magnification and resolution. The microscope is relatively easy to adjust, even by inexperienced elementary students.

An example of a prior art microscope is the one disclosed in U.S. Pat. No. 3,391,975 granted July 9, 1968. Many thousands of that microscope have been manufactured and satisfactorily used. That student microscope included a block formed with a large opening accommodating a mirror pivotally mounted about an axis orthogonal to the axis of a small opening formed in the block that intersects with the large opening so that the mirror may reflect light into the small opening. A lens means was supported above the small opening. Cam means controlled the positioning of the lens means in a direction along the axis of the small opening to permit focusing of the lens along a slide plane adjacent to the top of the opening. A slide support helped to keep a slide in position in the slide plane between the small opening and the lens means. A preferred embodiment of the present invention includes all these features.

That microscope included a bead lens supported by flexible cantilevered means and vertically displaced by the cam. The simple bead lens, while providing considerable magnification, did not provide as much magnification as would be desired with as high a resolution over as wide an optical field.

Accordingly, it is an important object of this invention to provide a microscope that retains the advantages of the patented microscope just described while increasing optical performance with a mechanical structure that remains rugged, easy to manipulate by inexperienced elementary students and low in cost.

It is another object of the invention to provide a microscope in accordance with the preceding object that is characterized by a compound lens.

It is a further object of the invention to achieve one or more of the preceding objects while providing good control of the axial displacement of the compound lens.

SUMMARY OF THE INVENTION

According to the invention, there is main support means for carrying lens support means which in turn carries a lens. The lens support means includes a normally horizontal member cantilevered from a normally vertical member formed with a channel arranged for normally vertical movement relative to a side of the main support means. Cam means attached to the main support means coacts with this normally vertical member to selectively position it vertically relative to the main support means and thereby correspondingly relatively position the normally horizontal member.

Preferably, the normally horizontal member carries a compound lens with its axis normally vertical and coaxial with an opening in the main support means that carries light for illuminating a specimen placed between the compound lens and the opening in the main support means so that the relative vertical displacement effected by the cam means functions to focus the compound lens upon a specimen located just above the lens opening.

Preferably, the vertical member is formed with an opening for receiving a cam cap attached to a wheel, the wheel and cam cap being pivotally supported upon the main support means so that the cam cap wheel assembly functions not only for vertically displacing the member, but also for keeping it in a fixed position horizontally.

Numerous other features, objects and advantages will become apparent from the following specification when read in connection with the accompanying drawing in which:

DETAILED DESCRIPTION OF PREFERRED EMBODIMENTS

Figure 1:
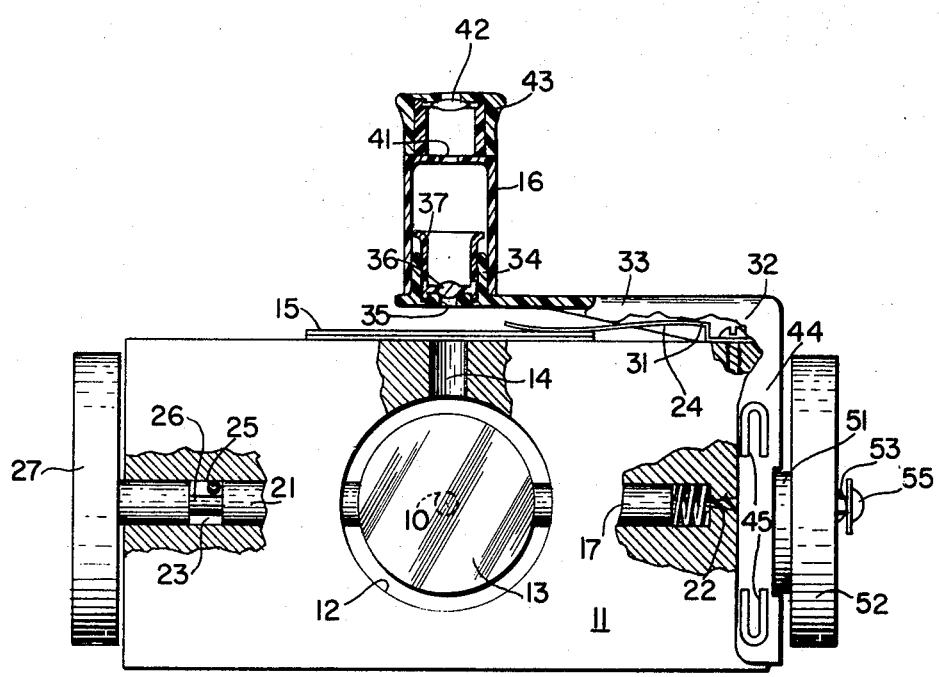
FIG. 1 is a front view of a preferred embodiment of the invention with portions cut away and shown in section to better illustrate certain features of the invention.

With reference now to the drawing and more particularly FIG. 1 thereof, there is shown a front view of a preferred embodiment of the invention. A rectangular wooden block 11 comprises the main support means and is formed with a circular opening 12 extending from the front to the back accommodating mirror 13. Block 11 is also formed with a vertical opening 14 for conveying light from mirror 13 through the specimen slide 15 along the vertical axis of compound lens assembly 16.

Mirror 13 is supported for pivotal movement about a normally horizontal axis that intersects the normally vertical common axis of opening 14 and compound lens assembly 16. An inside dowel 17 carries an inside corner of mirror 13 and an outside dowel 21 carries an outside corner of mirror 13. Dowels 17 and 21 reside in horizontal openings 22 and 23. A spring 24 urges dowel 17, mirror 13 and the right portion of dowel 21 against spring clip 25. Dowel 21 is turned down at an intermediate portion 26 to accommodate spring clip 25. A wheel 27 is attached to dowel 21 to complete the mirror positioning assembly, rotation of wheel 27 controlling the angular orientation of mirror 13 about the normally horizontal axis. The inside ends of dowels 17 and 21 are hollowed out or grooved for accommodating the corners of mirror 13.

Mirror 13 may be of any shape, such as rectangular or round as shown. Preferably one side of mirror 13 is small and occupied only the area 10. By making the reflecting area 10 much smaller than the exposed large area and the area of opening 12, light may be reflected upon the specimen at a narrow angle to enhance image resolution without appreciably decreasing the light under certain circumstances. A large mirror surface, like that shown in FIG. 1 on the exposed side of mirror 13, may result in decreased image resolution without appreciably increasing the light, particularly when reflecting diffuse skylight.

A spring clip 31 is screwed to the top of block 11 for holding slide 15 into position above opening 14.

Lens mount 32 is a generally L-shaped member having a normally horizontal portion 33 formed at the end with a hollow circular upstanding rim 34 extending from a base having a small opening 35 coaxial with the compound lens axis and that of opening 14. The lower lens element 36 rests over opening 35, held in place by retaining ring 37. Lens tube 16 is formed with an upper aperture 41 coaxial with the vertical axis of tube 16 and carries upper lens element 42 at the top. An eye-cap 43 fits over lens 42 and the top of lens tube 16 to keep upper lens 42 in place and complete the lens assembly.

The vertical portion 44 of lens mount 32 is formed with four spring fingers to grip the front and back of block 11, two of these fingers 45 being visible in FIG. 1.

Figure 2:
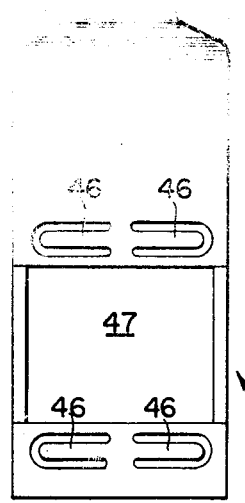
FIG. 2 is a side view of the L-shaped member that supports and positions the compound lens.

Referring also to FIG. 2, there is shown an end view of lens mount 32 showing four other spring fingers 46 for gripping the right side of block 11. FIG. 2 also shows the rectangular opening 47 for accommodating cam cap 51 eccentrically attached to focusing wheel 52 so that rotation of focusing wheel 52 moves lens mount 32 up and down to effect focusing. Focusing wheel 52 and its cam cap 51 are secured to block 11 by an assembly including a spring and a wood screw 55.

There has been described a novel student's microscope characterized by sufficient ruggedness to be used by elementary school students, ease of adjustment and operation, low cost and exceptionally high optical performance for an instrument to be used by elementary school students. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A microscope comprising, main support means, lens support means having a generally horizontal portion cantilevered from a generally vertical portion, said normally generally vertical portion being three-sided with two opposed sides formed with inwardly extending fingers gripping opposed sides of said main support means near one end thereof and the third side formed with a generally rectangular opening adjacent to said one end and normally vertically slideable along said one end of said main support means, and cam means inside said opening carried by said main support means for coacting with said normally generally vertical portion to control the normal vertical position thereof and comprise means for focusing said microscope, said cam means being eccentrically attached to a knob member rotatably mounted on said main support means.

2. A microscope in accordance with claim 1 and further comprising a compound lens assembly carried by said normally horizontal portion.

3. A microscope in accordance with claim 2 wherein said normally horizontal portion includes a generally circular upstanding rim surrounding a lower aperture coaxial about the axis of said compound lens.

4. A microscope in accordance with claim 3 wherein said compound lens comprises a lower lens centered over said lower aperture, a retaining ring over said lower lens and inside said upstanding rim, a lens tube at its lower end surrounding said upstanding rim and at its upper end having means for supporting an upper lens coaxial about the lower aperture axis and having means defining an upper aperture between the latter means for supporting and he lower aperture, and an upper lens seated in said means for supporting an upper lens.

5. A microscope in accordance with claim 1 and further comprising, mirror means having a large area on one side silvered for reflecting light along a viewing axis and having a much smaller silvered area on the opposite side for reflecting light along said viewing axis at a narrow angle, said mirror means being mounted on said main support means for illuminating a specimen to be viewed.

* * * * *